United States Patent [19]

Stewart, Jr.

[11] Patent Number: 5,630,656
[45] Date of Patent: May 20, 1997

[54] ANTI-LOCKING BRAKE SYSTEM, REAR BRAKE DELAY VALVE, AND METHOD FOR SAME

[76] Inventor: Howard C. Stewart, Jr., 813 E. Farris Ave., High Point, N.C. 27262

[21] Appl. No.: 435,826

[22] Filed: May 5, 1995

Related U.S. Application Data

[63] Continuation-in-part of Ser. No. 14,700, Feb. 8, 1993, Pat. No. 5,350,223, and Ser. No. 83,611, Jun. 28, 1993, Pat. No. 5,310,252.

[51] Int. Cl.$^6$ ..................................................... B60T 8/62
[52] U.S. Cl. .................... 303/9.62; 188/351; 303/9.75; 303/84.2; 303/113.5
[58] Field of Search ..................... 303/9.62, 9.75, 303/84.2, 113.5; 188/351; 137/493, 513.3, 513.5, 846

[56] References Cited

U.S. PATENT DOCUMENTS

| | | |
|---|---|---|
| 2,173,979 | 9/1939 | Picut. |
| 2,742,982 | 4/1956 | Helmbold. |
| 2,767,733 | 10/1956 | Anderson ............................... 137/513.3 |
| 2,805,737 | 9/1957 | Griffin. |
| 3,037,522 | 6/1962 | Millan ...................................... 137/854 |
| 3,159,176 | 12/1964 | Russell et al. ........................ 137/493.1 |
| 3,204,413 | 9/1965 | Pace. |
| 3,283,504 | 11/1966 | Stelzer ................................... 137/493.1 |
| 3,308,798 | 3/1967 | Snider. |
| 3,385,062 | 5/1968 | Cadmus. |
| 3,420,342 | 1/1969 | Botterill. |
| 3,439,500 | 4/1969 | Hertell. |
| 3,504,948 | 4/1970 | Inada ...................................... 303/9.62 |
| 3,580,273 | 5/1971 | Schwarz. |
| 3,760,912 | 9/1973 | Braun. |
| 3,941,149 | 3/1976 | Mittleman. |
| 4,014,410 | 3/1977 | Bryant. |
| 4,132,241 | 1/1979 | Iannelli. |
| 4,373,333 | 2/1983 | Coleman. |
| 4,458,711 | 7/1984 | Flider. |
| 4,619,287 | 10/1986 | Hama et al.. |
| 4,799,575 | 1/1989 | Kroniger ................................. 188/71.6 |
| 5,178,442 | 1/1993 | Toda et al.. |
| 5,192,120 | 3/1993 | Reinartz et al.. |
| 5,201,570 | 4/1993 | Heren et al.. |
| 5,215,358 | 6/1993 | Beilfuss et al.. |
| 5,219,210 | 6/1993 | Maehara. |
| 5,222,787 | 6/1993 | Eddy et al. ........................... 137/493.1 |
| 5,249,598 | 10/1993 | Schmidt. |
| 5,251,968 | 10/1993 | Rath. |
| 5,350,223 | 9/1994 | Stewart, Jr.. |

*Primary Examiner*—Matthew C. Graham
*Attorney, Agent, or Firm*—Allen, Dyer, Doppelt, Franjola & Milbrath, P.A.

[57] ABSTRACT

A vehicle braking system is provided for delaying the flow of brake fluid to the rear brakes to reduce the risk of locking the rear brakes. The braking system preferably has a master cylinder, a pair of disk brakes respectively positioned on a pair of rear wheels of a vehicle, and inlet and outlet brake lines each respectively connected to the master cylinder and the pair of rear disk brakes. A fluid circulator valve preferably is positioned between and in fluid communication with the master cylinder and the pair of rear disk brakes and is connected to the inlet and outlet brake lines. A rear brake delay valve preferably is positioned between and in fluid communication with the circulator valve and the pair of rear disk brakes and is connected to the inlet brake line. The rear brake delay valve preferably has a housing including a first opening connected to a first portion of the inlet brake line and a second opening connected to a second portion of the inlet brake line, and a check valve positioned within the housing in fluid communication with the first and second openings. The check valve has a perforated member having a predetermined sized orifice extending therethrough so that the check valve delays fluid flowing from the first opening through the second portion of the inlet brake lines and to the pair of rear disk brakes.

29 Claims, 4 Drawing Sheets

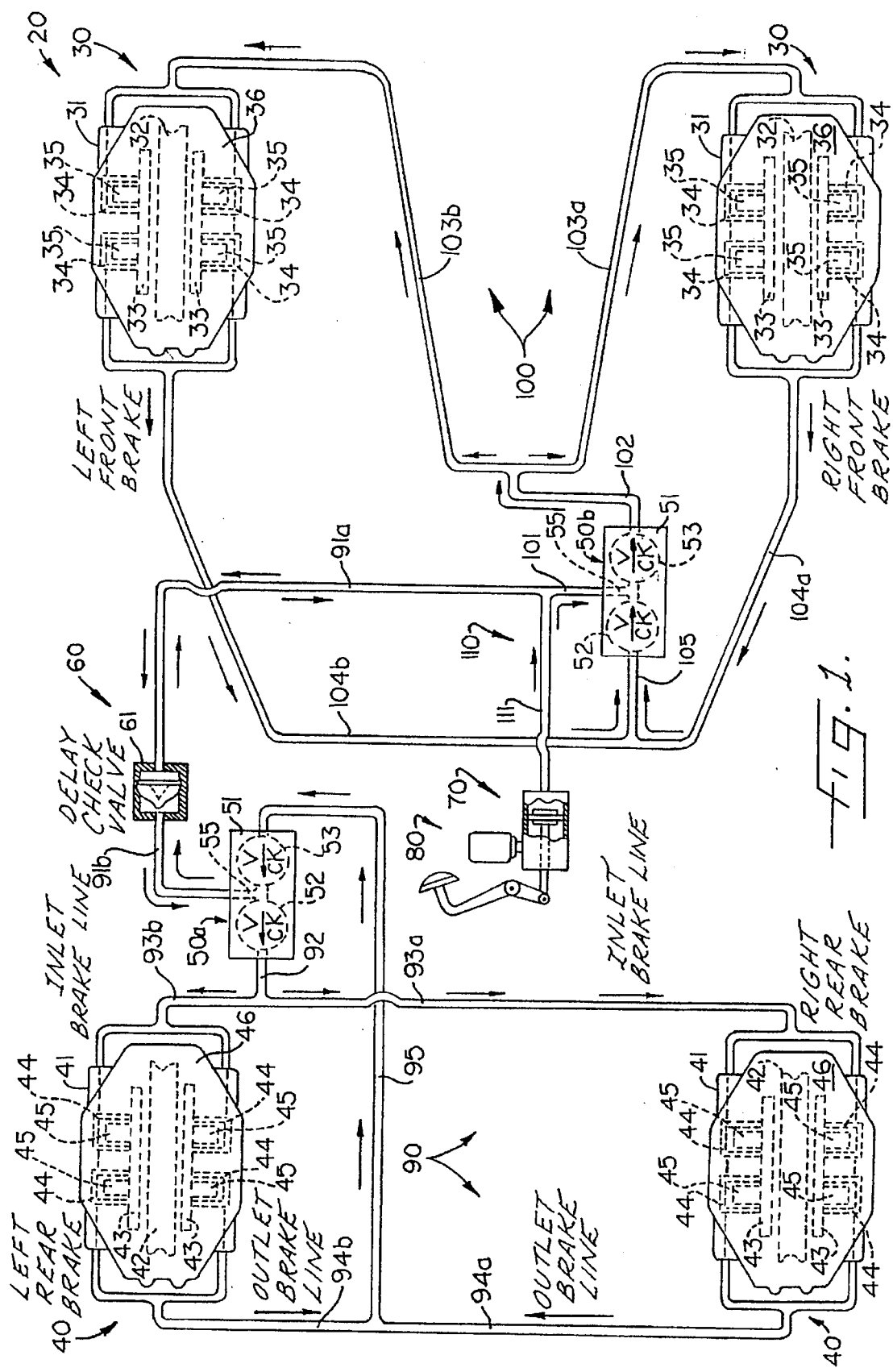

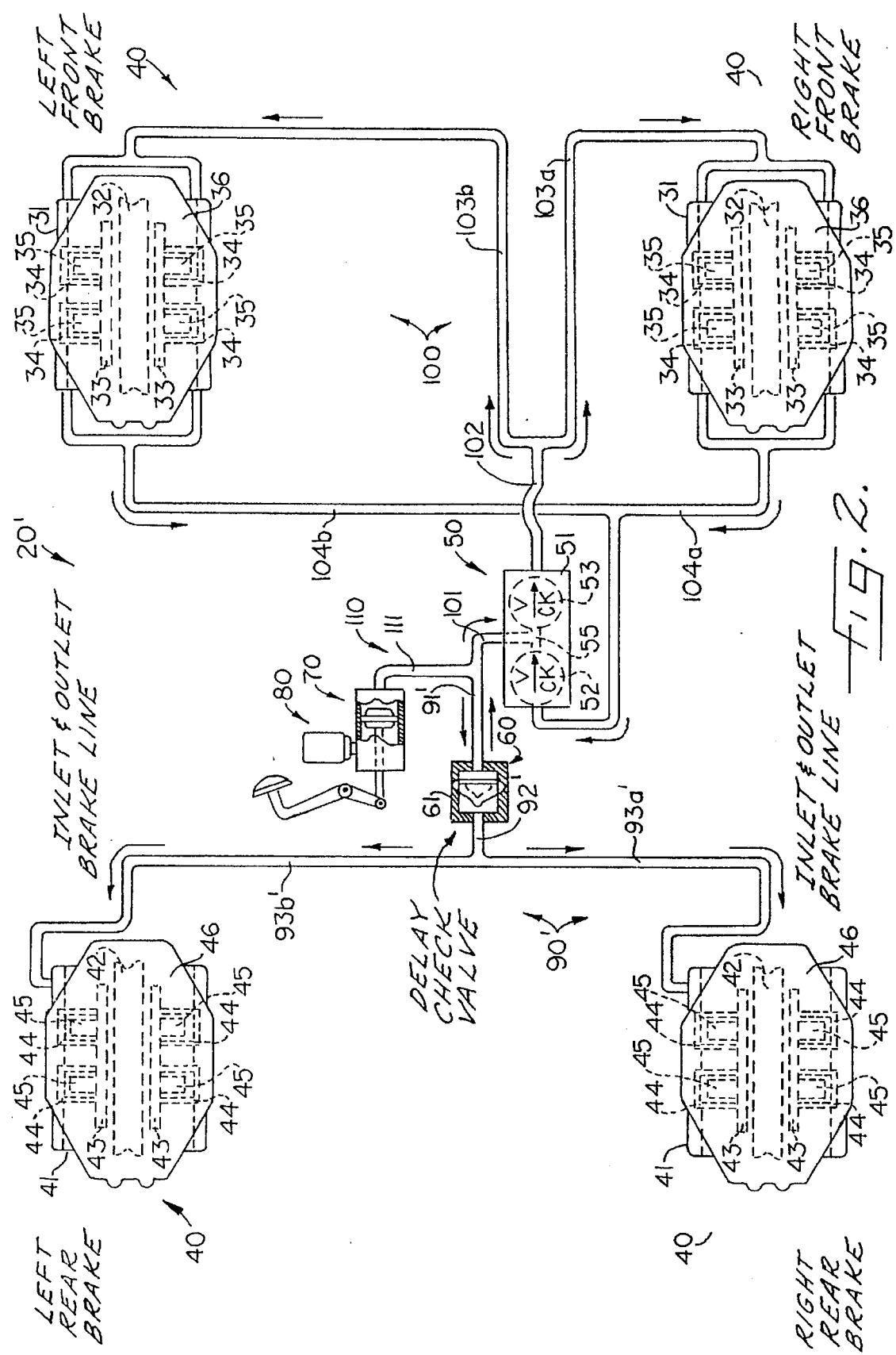

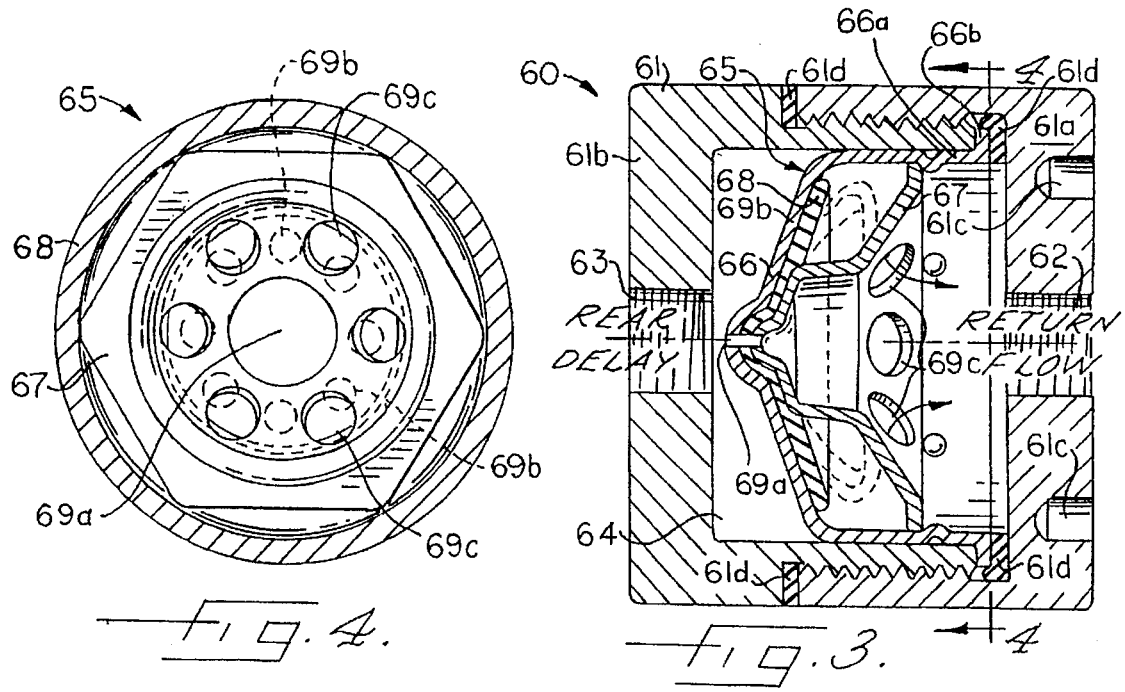
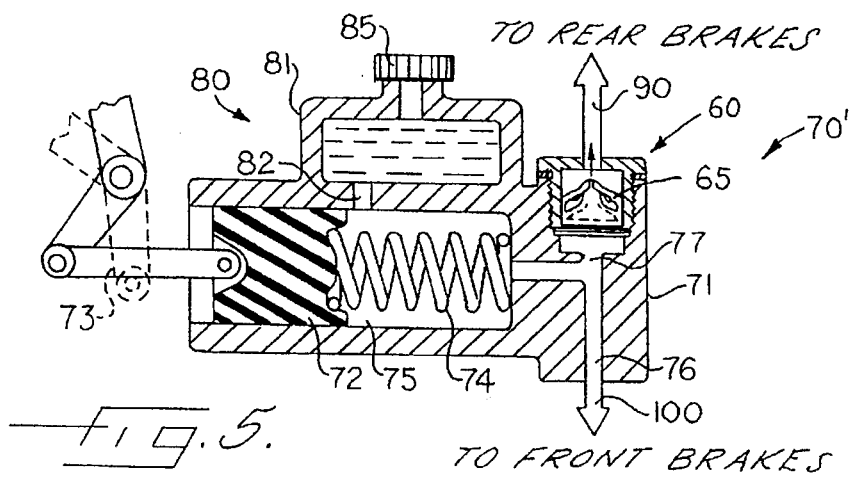
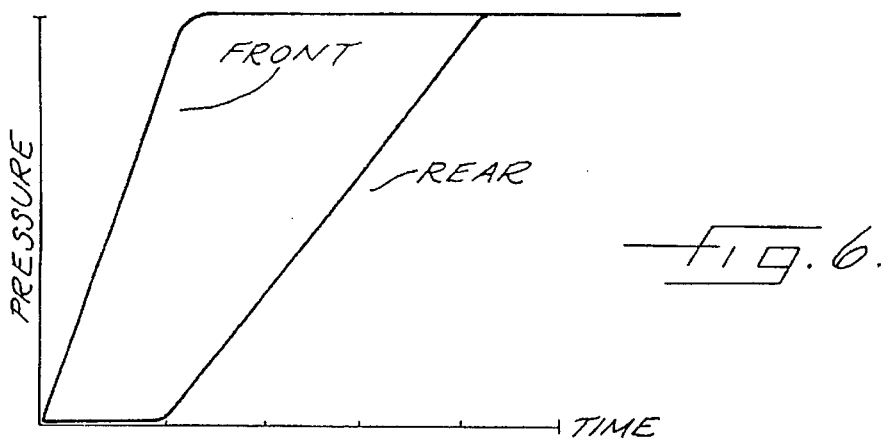

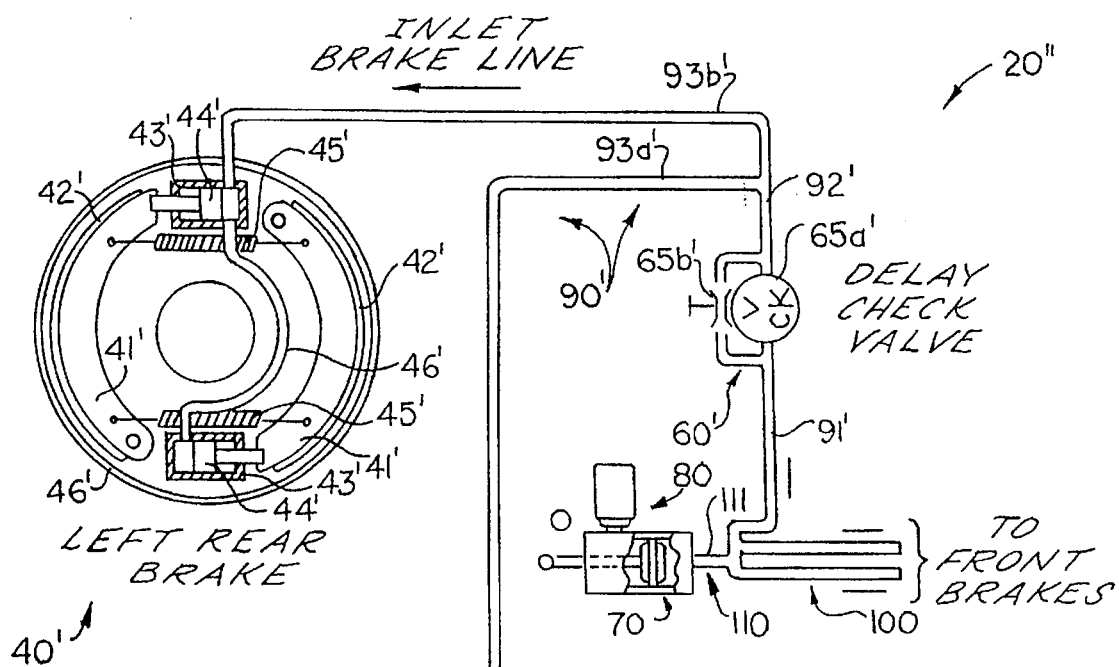
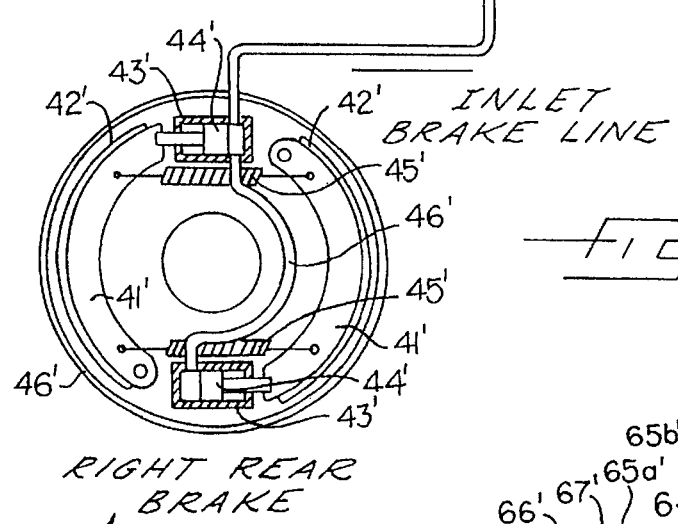
Fig. 7.
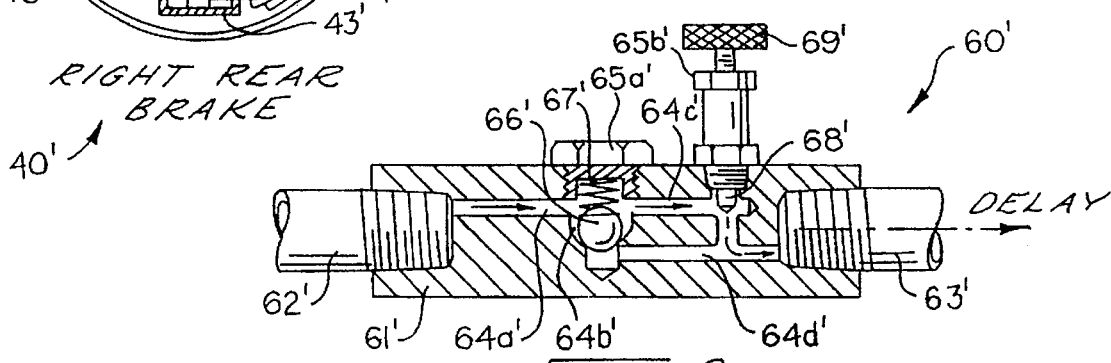
Fig. 8.

ANTI-LOCKING BRAKE SYSTEM, REAR BRAKE DELAY VALVE, AND METHOD FOR SAME

RELATED APPLICATIONS

This application is a continuation-in-part of U.S. patent applications Ser. No. 08/014,700 filed on Feb. 8, 1993, now issued U.S. Pat. No. 5,350,223, and Ser. No. 08/083,611 filed on Jun. 28, 1993 now U.S. Pat. No. 5,350,252 which are hereby incorporated herein by reference.

FIELD OF THE INVENTION

This invention relates to a vehicle braking system and more particularly to an anti-locking braking system and a rear brake delay valve for vehicles.

BACKGROUND OF THE INVENTION

Braking systems in vehicles have been recognized to engage and lock up during sudden application. This locking of the brakes may cause steering by the driver to be quite difficult and in extreme conditions may cause the driver to lose control of the vehicle.

Under hard and sudden braking, most automobiles tend to lock-up the rear brakes first (versus the front brakes). The more heavily the driver brakes, the greater the vehicle experiences a dynamic shifting of the weight of the vehicle from the rear axle to the front axle. This shifting typically causes a front/rear brake bias to be skewed toward the rear of the automobile, causes the rear wheels to lock-up, and causes the automobile tires to skid on the travelling surface.

Racing automobiles are even more prone to rear brake lock-up than standard automobiles due to the reverse torque and the higher revolutions per minute ("RPM's") of the engine. When a driver releases the throttle of the car, the reverse torque of the engine applies a major portion of the braking effort to the rear wheels. The rear braking effort of the braking system coupled with the reverse torque of the engine further causes the rear wheels to lock-up. Therefore, the driver typically must apply the brakes slowly to prevent this lock-up of the rear brakes.

Automobile manufacturers have approached solving this brake lock-up problem by using various systems and techniques. For example, proportioning valves have been installed on automobiles which allow the front and rear brakes to have proportionally the same brake fluid pressure up to what is referred to as the "knee" point. At this "knee" point pressure, the brake fluid pressure for the rear brakes increases at a fixed percentage as compared to the front brakes. This is conventionally accomplished with a valve consisting of a step piston and a spring. The step piston is restrained by the spring until it is overcome by the brake fluid pressure at the "knee" point. Then, the rear brake fluid pressure increase is reduced an amount equal to the difference in the area of the piston step. An example of such a system may be seen in U.S. Pat. No. 5,222,787 by Eddy et al. titled "*Electro-Hydraulic Braking System.*" These proportioning valve systems, however, fail to be effective primarily because the initial brake fluid pressure locks the rear wheels, and such a system has no effect on the initial brake fluid pressure.

Also, computerized anti-locking braking systems ("ABS") have been developed which sense the rotation of the wheels of an automobile. In such systems, when the wheel rotation stops, the brakes are released. Examples of such systems may be seen in U.S. Pat. No. 5,192,120 by Reinartz et al. titled "*Brake Pressure Control System With An Electrical Motor Operating A Pump And Control Valve*"; U.S. Pat. No. 5,178,442 by Toda et al. titled "*Brake Pressure Controlling Apparatus*"; and U.S. Pat. No. 5,219,210 by Maehara titled "*Brake Fluid Pressure Controller For Vehicle.*" The computerized ABS, however, have at least two major disadvantages: (1) such systems are very expensive and complicated; and (2) such systems only work when the car is travelling in a relatively straight line, e.g., a car cornering can be sliding the tires from excessive braking force, yet the wheels will still be rotating.

Further, restricting fluid flow from the rear brakes to prevent initial rear brake lock-up has also been attempted in the past. Problems arose in such systems, however, due to the small orifice size in the brake lines necessary to make these fluid restriction systems effective during application of the brakes by a driver of a vehicle with such a system. In this type of system, the brake fluid is forced through an orifice in the brake lines during application of the brakes. During release of the brakes, however, the fluid returning from the rear brakes takes an excessive amount of time to pass back through the orifice causing the brakes to drag and overheat.

SUMMARY OF THE INVENTION

It is therefore an object of the present invention to provide an anti-locking brake system for delaying the flow of brake fluid to the rear brakes to reduce the risk of locking the rear brakes during driving of the vehicle.

It is also an object of the present invention to provide a rear brake delay valve arranged to be easily installed into existing vehicle systems which delays the flow of brake fluid to the rear brakes to reduce the risk of locking the rear brakes during driving of the vehicle.

More particularly, a vehicle braking system for delaying the flow of brake fluid to the rear brakes is provided according to an embodiment of the present invention which preferably has a master cylinder and a pair of hydraulically operable disk brakes respectively positioned on a pair of rear wheels of a vehicle. A rear inlet brake line is connected in fluid communication with the master cylinder and the pair of rear disk brakes. A rear outlet brake line is also connected in fluid communication with the pair of rear disk brakes and in fluid communication with the master cylinder. A rear brake delay valve preferably is positioned between and in fluid communication with the master cylinder and the pair of rear disk brakes and is connected to the rear inlet brake line.

The rear brake delay valve according to the present invention preferably includes a housing having a first opening connected to a first portion of the rear inlet brake line connected to the master cylinder and a second opening connected to a second portion of the rear inlet brake line connected to the pair of rear brakes. The delay valve also includes a perforated member preferably having a plurality of openings therein, an elastomeric member cooperating with the perforated member, and a predetermined sized orifice extending through a medial portion of the perforated member and the elastomeric member. The perforated member and the elastomeric member each are preferably positioned within the housing in fluid communication with the first and second openings. During application of the brakes, the elastomeric member is adapted to cooperate with the perforated member so that fluid flowing from the first opening is directed to flow only through the orifice and to the second opening, through the second portion of the rear inlet brake line, and to the pair of rear disk brakes. During release of the brakes, the elastomeric member also allows fluid flowing from the second opening through the plurality of openings of the perforated member to the first opening, and to the first portion of the rear inlet brake line.

A vehicle braking system according to another embodiment of the present invention is provided for delaying the flow of brake fluid to the rear brakes to thereby prevent locking of the rear brakes. The is braking system preferably has a master cylinder, a pair of disk brakes respectively positioned on a pair of rear wheels of a vehicle, and inlet and outlet brake lines each respectively connected to the master cylinder and the pair of rear disk brakes. A fluid circulator valve preferably is positioned between and in fluid communication with the master cylinder and the pair of rear disk brakes, and is connected to the inlet and outlet brake lines. The fluid circulator valve allows fluid to flow therethrough in only one direction from the master cylinder to the inlet brake line and to the pair of rear disk brakes, and the fluid circulator valve also allows fluid to flow in only one direction from the pair of rear disk brakes, through the outlet brake line, through the fluid circulator valve, and into the master cylinder. A rear brake delay valve preferably is positioned between and in fluid communication with the circulator valve and the pair of rear disk brakes and is connected to the inlet brake line. The rear brake delay valve preferably has a housing including a first opening connected to a first portion of the inlet brake line and a second opening connected to a second portion of the inlet brake line, and a check valve positioned within the housing in fluid communication with the first and second openings. The check valve has a perforated member having a predetermined sized orifice extending therethrough so that the check valve delays fluid flowing from the first opening through the second portion of the inlet brake lines, and to the pair of rear disk brakes.

A master cylinder for a vehicle braking system according to yet another embodiment of the present invention is also provided which includes a housing having first and second openings therein respectively arranged for connecting to a front brake line and to a rear brake line. A fluid reservoir preferably is connected to the housing. A piston chamber is positioned within the housing and in fluid communication with the first and second openings and the fluid reservoir. A piston is operatively positioned within the piston chamber. A rear brake delay valve preferably is positioned within the housing of the master cylinder and in fluid communication with the second opening and the piston chamber and arranged for operative fluid communication with rear brakes through the rear brake line. The rear brake delay valve preferably includes at least a perforated member having at least a predetermined sized orifice extending therethrough whereby the rear brake delay valve delays fluid flowing from the piston chamber through the second opening and to the pair of rear brakes, and allows fluid flowing from the pair of rear brakes and through the second opening to also readily flow to the piston chamber.

The present invention further includes a method of delaying fluid flow from a piston chamber of a master cylinder to a pair of rear brakes. The method preferably includes positioning at least a perforated member having a plurality of openings therein in fluid communication with the piston chamber of the master cylinder for operative fluid communication with the pair of rear brakes. During application of the brakes of the vehicle, fluid passes from the piston chamber through at least one opening in the perforated member and to the pair of rear brakes so as to delay fluid flow thereto. During release of the rear brakes, however, fluid passes from the pair of rear brakes through a plurality of the openings in the perforated member and to the piston chamber of the master cylinder so as to allow fluid to readily flow from the pair of rear brakes and to the piston chamber.

The rear brake delay valve and/or the configuration of the vehicle braking system of the present invention compensates for the dynamic shifting of the weight of the vehicle from the rear axle to the front axle. This shifting typically causes a front/rear brake bias to be skewed toward the rear of the vehicle, causes the rear wheels to lock-up, and causes the vehicle tires to skid on the travelling surface. Such as in racing automobiles, the rear braking effort of a conventional braking system coupled with the reverse torque of the engine further causes the rear wheels to lock-up. Therefore, the driver conventionally had to apply the brakes slowly to prevent this lock-up of the rear brakes. By providing a simple mechanical and relatively inexpensive solution, i.e., rear brake delay valve as the only additional necessary component of the system, to delay the application of the rear brakes, the rear brake delay valve 60 of the present invention solves this problem. Because of the construction and configuration of the delay valve, the delay valve can readily be retrofit or added to existing vehicles. Having the fluid circulator valve operatively connected in the system, the system provides the additional benefits of providing a fluid circulation path for cooling the fluid through the brakes of the vehicle and purging or removing air or other gases from the brake lines.

BRIEF DESCRIPTION OF THE DRAWINGS

Some of the objects and advantages of the present invention having been stated, others will become apparent as the description proceeds when taken in conjunction with the accompanying drawings, in which:

FIG. 1 illustrates a schematic view of a vehicle anti-locking brake system according to a first embodiment of the present invention;

FIG. 2 illustrates a schematic view of a vehicle anti-locking brake system according to a second embodiment of the present invention;

FIG. 3 illustrates a vertical sectional view of a first embodiment of a rear brake delay valve of a vehicle anti-locking brake system according to the present invention;

FIG. 4 illustrates a transverse sectional view of a first embodiment of a rear brake delay valve of a vehicle anti-locking brake system according to the present invention;

FIG. 5 illustrates a master cylinder of a third embodiment of a vehicle anti-locking brake system according to the present invention;

FIG. 6 graphically illustrates operational delay for pressure applied to the front and rear brakes of a vehicle versus time according to a vehicle anti-locking brake system according to the present invention;

FIG. 7 schematically illustrates a fourth embodiment of a vehicle anti-locking braking system according to the present invention; and FIG. 8 illustrates a vertical sectional view of a second embodiment of a rear brake delay valve according to a fourth embodiment of a vehicle anti-locking braking system according to the present invention.

DETAILED DESCRIPTION OF ILLUSTRATED EMBODIMENTS

The present invention now will be described more fully hereinafter with reference to the accompanying drawings in which preferred embodiments of the invention are shown.

This invention may, however, be embodied in many different forms and should not be construed as limited to the illustrated embodiments set forth herein; rather, the embodiments are provided so that this disclosure will be thorough and complete and will fully convey the scope of the invention to those skilled in the art. Like numbers refer to like elements throughout.

FIGS. 1, 2, and 7 schematically illustrate three respective embodiments of a vehicle anti-locking brake system 20, 20', 20" according to the present invention. Each of the embodiments of the system 20, 20', 20" include a rear brake delay valve 60, 60' operatively connected in fluid communication in the braking system 20, 20', 20" of a vehicle. A prime (') or double prime (") notation has been used to illustrate like elements having different configurations in the various embodiments.

FIG. 1 illustrates a schematic view of a vehicle antilocking brake system 20 according to a first embodiment of the present invention arranged for delaying the flow of brake fluid to the rear brakes 40. The braking system 20 of this embodiment preferably includes a master cylinder 70 and a pair of hydraulically operable disk brakes 40 respectively positioned on a pair of rear wheels of a vehicle. A rear inlet brake line 91a, 91b, 92 is connected in fluid communication with the master cylinder 70 and connected to the pair of rear disk brakes 40. A rear outlet brake line 94a, 94b, 95 is connected in fluid communication with the pair of rear disk brakes 40 and in fluid communication with the master cylinder 70.

In this first embodiment, preferably, a first fluid circulator valve 50a is positioned between and in fluid communication with the master cylinder 70 and the pair of rear disk brakes 40, and connected to the inlet 91a, 91b, 92 and outlet brake lines 93a, 93b, 94. The first fluid circulator valve 50a allows fluid to flow therethrough in only one direction from the master cylinder 70 to the rear inlet brake line 91a, 91b, 92 and to the pair of rear disk brakes 40. The first fluid circulator valve 50a also allows fluid to flow in only one direction from the pair of rear disk brakes 40, through the rear outlet brake lines 94a, 94b, 95 through the first fluid circulator valve 50a, and into the master cylinder 70.

Additionally, the braking system 20 includes a pair of front disk brakes 30 and front inlet 102, 103a, 103b and outlet 104a, 104b, 105 brake lines connected to the front disk brakes 40. A second fluid circulator valve 50a, preferably similar in construction and operation to the first fluid circulator valve 50b, is positioned between and in fluid communication with the master cylinder 70 and the pair of front disk brakes 30, and connected to the front inlet 102, 103a, 103b and outlet 104a, 104b, 105 brake lines. The second fluid circulator valve 50b allows fluid to flow therethrough in only one direction from the master cylinder 70 to the front inlet brake lines 102, 103a, 103b and to the pair of front disk brakes 30. The second fluid circulator valve 50b also allows fluid to flow in only one direction from the pair of front disk brakes 30, through the outlet brake lines 104a, 104b, 105 through the second fluid circulator valve 50b, and into the master cylinder 70.

FIG. 2 illustrates a schematic view of a vehicle antilocking brake system 20, 20' according to a second embodiment of the present invention. In this embodiment, the fluid circulator valve 50 is only provided for fluid circulation to the front brakes 30 of a vehicle and not the rear brakes 40. This embodiment may be preferred, for example, where overheating of the rear brakes 40 during operation is less of a problem than the front brakes 30 so that the front brakes have fluid circulating therethrough for purging air from the braking system 20' and cooling the brakes 30 as illustrated.

Each of the respective front 30 and rear brakes 40 in the embodiments of FIGS. 1 and 2 is illustrated as hydraulically operable disk brakes 30, 40. Each of the disk brakes 30, 40 preferably includes a caliper 31, 41 including a plurality of cylinders 34, 44 or piston chambers and a plurality of respective hydraulically operable brake pistons 35, 45 respectively guided in the cylinders 34, 44. An inlet brake line 93a, 93b, 103a, 103b fluidly interconnects the master cylinder 70 to the caliper 31, 41 for supplying brake fluid from a fluid reservoir 80 connected in fluid communication with the master cylinder 70 to the respective calipers 31, 41. Although the braking system 20, 20' and disk brakes 30, 40 are illustrated in this manner in this embodiment, various other embodiments of the brakes and braking systems with a fluid circulator valve are also included in this present invention. Some examples of other types of brakes and braking systems included in the present invention are further illustrated and described in copending U.S. patent application Ser. No. 08/083,611 filed on May 10, 1994 which is hereby incorporated herein by reference.

The fluid circulator valves 50, 50a, 50b of the present invention, as best illustrated in FIGS. 1 and 2, each preferably include a housing 51 having a first opening 51a connected to the inlet brake lines 92, 102, a second opening 51b connected to the outlet brake lines 95, 105, and a third opening 51c connected to the master cylinder 70 of the braking system 20, 20', preferably through a manifold or piping having a plurality of outlet ports illustrated as brake lines 91a, 91b, 101, 111. An expansion chamber 55 is positioned within the housing 51 and communicates with all of the openings for receiving fluid therein.

First and second valve means, illustrated in the form of first 53 and second 52 check valves, are positioned within the housing 51 in communication with the expansion chamber 55 and in fluid communication with each other within the housing 51. The first valve means 53 preferably is constructed for allowing fluid to flow therethrough in only one direction and through the first opening 51c, and the second valve means 52 is constructed for allowing fluid to flow therethrough and through the second opening 51b and in a common direction as the fluid flow through the first valve means 53. The fluid circulator valves 50, 50a, 50b further each include means, i.e., preferably a spring positioned between the two valves 52, 53, for positioning the first and second valves 52, 53 in spaced apart relation within the housing 51. The first valve 52 is positioned adjacent the first opening 51a and the second valve 53 is positioned adjacent the second opening 51b.

The positioning and construction of the fluid circulator valves 50, 50a, 50b as illustrated in these embodiments are further described and illustrated in copending U.S. patent applications Ser. No. 08/014,700 filed on Feb. 8, 1993, now issued U.S. Pat. No. 5,350,223, and Ser. No. 08/083,611 filed on May 10, 1994 which are hereby incorporated herein by reference. Accordingly, for brevity the fluid circulator valves 50, 50a, 50b will not be described further herein.

Also in this first embodiment of the present invention, a rear brake delay valve 60 preferably is positioned between and in fluid communication with the fluid circulator valve 50 and the master cylinder 70 and connected to the rear inlet brake line 91a, 91b. As best illustrated in FIGS. 3 and 4, the rear brake delay valve 60 preferably includes a housing 61 having a first opening 62 or port therein connected to a first portion of the rear inlet brake line 91a fluidly connected to the master cylinder 70 and a second opening 63 connected to a second portion 91b of the rear inlet brake line 91a, 91b fluidly connected to the fluid circulator valve 50. The housing 61 of the rear brake delay valve 60 is preferably cylindrical-shaped, formed of a aluminum material, has dimensions of about 1.5-inches outside diameter and about 1-inch in length, and further preferably has an expansion chamber 64 positioned within the housing 61 and fluidly communicating with the first and second openings 62, 63 for receiving fluid therein. A perforated member 65 as illustrated is positioned within the housing 61.

The rear brake delay valve 60 preferably further includes a first perforated member 67 having a plurality of openings 69c therein including a predetermined sized orifice 69a and a second perforated member 66 having a plurality of openings 69b therein including a predetermined sized orifice 69a which preferably corresponds to the size and positioning of the orifice 69a in the first perforated member 67. Resilient means 68, preferably being an elastic member such as the rubber disk shown, is positioned between the first and second perforated members 66, 67 so as to cover the plurality of openings 69b, 69c in the first and second perforated members 66, 67 except for each of the respective orifices 69a. The sizes of the orifices 69a preferably range from about 0.0125 inches to about 0.0175 inches, and about 0.0156 inches is preferred.

The rear brake delay valve 60 preferably is arranged and constructed so that fluid flowing from the first opening 62 is directed to flow only through the respective orifices 69a of the first perforated member 67, the resilient means 68, and the second perforated member 66 and to the second opening 63, through the second portion of the inlet brake lines 91b and, to the pair of rear disk brakes 40. The resilient means 68 of the delay valve 60 also allows fluid flowing from the second opening 63 through the plurality of openings 69a, 69b, 69c of the first and second perforated members 66, 67 to the first opening 62, and to the first portion 91a of the inlet brake lines. This increased fluid flow during the release of the brakes 40 operable by brake pedal and linkage 73, i.e., return fluid flow, reduces or prevents the brakes 40 from dragging and overheating such as caused by conventional restriction valves.

In the first embodiment of the rear brake delay valve 60, as best illustrated in FIGS. 3 and 4, the resilient means 68 preferably is an elastomeric member having a medial portion thereof secured between respective medial portions of the first and second perforated members 66, 67. The first perforated member 67 of the rear brake delay valve 60 has a generally concave shape and the second perforated member 66 has a generally dome shape. The first concave-shaped perforated member 67 is cooperatively positioned within the inner confines of the dome-shaped second perforated member 66. Additionally, the second perforated member 66 preferably has a flange 66b extending outwardly from the base 66a of the second dome-shaped perforated member 66 for facilitating the positioning thereof within the expansion chamber 64 of the housing 61.

FIG. 6 graphically illustrates operational delay of application of the rear brakes 40 when braking pressure is applied to the front 30 and rear 40 brakes of a vehicle versus time according to a vehicle anti-locking brake system 20, 20', 20" according to the present invention. This responsive delay, e.g., illustrated as pressure versus time, allows a driver of the vehicle to apply the brakes hard and suddenly and still reduce the risk of and/or prevent lock-up of the rear brakes 40 first, i.e., versus the front brakes 30. As illustrated, the front brake pressure increases sharply when the brake pedal 73 is engaged or applied by the driver and the rear brake pressure increases at a slower rate but reaches about the same pressure as the front brakes 40.

The rear brake delay valve 60 and/or the configuration of the vehicle braking system 20, 20', 20" as illustrated compensates for the dynamic shifting of the weight of the vehicle from the rear axle to the front axle. This shifting typically causes a front/rear brake bias to be skewed toward the rear of the vehicle, causes the rear wheels to lock-up, and causes the vehicle tires to skid on the travelling surface. Such as in racing automobiles, the rear braking effort of a conventional braking system coupled with the reverse torque of the engine further causes the rear wheels to lock-up. Therefore, the driver conventionally had to apply the brakes slowly to prevent this lock-up of the rear brakes. By providing a simple mechanical and relatively inexpensive solution, i.e., rear brake delay valve 60, 60' as the only additional necessary component of the system, to delay the application of the rear brakes, the rear brake delay valve 60 of the present invention solves this problem. Because of the construction and configuration of the delay valve 60, the valve can readily be retrofit or added to existing vehicles.

FIG. 5 illustrates a master cylinder 70 of a third embodiment of a vehicle anti-locking brake system 20, 20', 20" according to the present invention. In this embodiment, the rear brake delay valve 60 is positioned within the housing 71 of the master cylinder 70'. The master cylinder 70' having the rear brake delay valve 60 therein can be retrofit into the embodiments having the master cylinder 70 illustrated in FIGS. 1 and 2 with the removal of the rear brake delay valve 60 illustrated in those embodiments. The master cylinder 70' according to the third embodiment may also be used a vehicle braking system 20, 20' as illustrated in FIGS. 1 and 2 without the rear brake delay valve 60 and the fluid circulator valves 50 as illustrated in these embodiments.

The braking system 20, 20' of this third embodiment preferably has a master cylinder 70', as best illustrated in FIG. 5, which includes a housing 71 having first 76 and second 77 openings or ports respectively connected to front and rear brake lines generally illustrated as 100. A fluid reservoir 80 preferably is connected to the housing 71, and preferably has a reservoir housing 81 connected to or integrally formed therewith. A piston chamber 75 is positioned within the housing 71 and in fluid communication with the first and second openings 76, 77 and the fluid reservoir 80, preferably through an orifice 82 as illustrated. A piston 72 is operatively positioned within the piston chamber 75, and a rear brake delay valve 60 is positioned within the housing 71 of the master cylinder 70' and in fluid communication with the second opening 77 and the piston chamber 75. A biasing member, illustrated as a spring 74, operatively cooperates with the piston 72 within the piston chamber 75.

Like the embodiments of FIGS. 1 and 2, as well as the embodiment of FIG. 7, the third embodiment of the system preferably includes a pair of hydraulically operable brakes 30 respectively positioned on a pair of front wheels of a vehicle. Front brake lines are connected to and in fluid communication with the first opening 76 of the master cylinder 70' and the pair of front brakes 30. A pair of hydraulically operable brakes 40 is also respectively positioned on a pair of rear wheels of a vehicle. Rear brake lines are also connected to and in fluid communication with the second opening 77 of the master cylinder 70' and the pair of rear brakes 40.

The rear brake delay valve 60 of the master cylinder 70' illustrated in FIG. 5 preferably includes a perforated member 67 having a plurality of openings 69c therein and an elastomeric member 68, i.e., resilient means as described above, secured to the perforated member 67. A predetermined sized orifice 69a, preferably similar in sizing as described above, extends through a medial portion of the perforated member 67 and the elastomeric member 68. The elastomeric member 68 cooperates with the plurality of openings 69c of the perforated member 67 so that fluid flowing from the piston chamber 74 is directed to flow only through the predetermined sized orifice 69a, through the second opening 77 and the inlet brake line, and to the pair of rear brakes 40. The elastomeric member 68 allows fluid flowing from the second opening 77 to also flow through the plurality of openings 69a of the perforated member 67 to the piston chamber 74.

In this embodiment of the master cylinder 70, the perforated member 67 of the rear brake delay valve 60 preferably is a first perforated member 67 having a plurality of openings 69c therein and the rear brake delay valve 60 further includes a second perforated member 66 having a plurality of openings 69b therein including a predetermined sized orifice 69a. The elastomeric member 68 is positioned between the first and second perforated members 66, 67 so as to cover the plurality of openings 69b, 69c in the first and second perforated members 66, 67, during fluid flow in a predetermined direction, except for each of the respective orifices 69a therein so that fluid flowing from the piston chamber 74 of the master cylinder 70' is directed to flow only through the respective orifices 69a of the first perforated member 67, the elastomeric member 68, and the second perforated member 66, through the second opening 77, through the rear brake lines, and to the pair of rear disk brakes 40. The elastomeric member 68 also allows fluid flowing from the pair of rear brakes 40, through the rear brake lines, through the second opening 77, and through the plurality of openings 69b, 69c of the first and second perforated members 66, 67 to the piston chamber 74. The operation and construction of the rear brake delay valve 60 is similar to the rear brake delay valve 60 described in the other embodiments except for the housing because the rear brake delay valve 60 in this embodiment is positioned within the housing of the master cylinder 70 as best illustrated in FIG. 5.

FIG. 7 schematically illustrates a fourth embodiment of a vehicle anti-locking braking system 20" according to the present invention. FIG. 8 illustrates a vertical sectional view of a second embodiment of a rear brake delay valve 60' according to a fourth embodiment of a vehicle anti-locking braking system 20" according to the present invention. The embodiments illustrated in FIGS. 7 and 8 preferably are used with vehicle braking systems having drum-type brakes 40' as illustrated positioned on the rear and/or the front wheels of the vehicle. The fourth embodiment of the vehicle braking system 20" illustrated in FIG. 7 does not include the fluid circulator valves 50, 50a, 50b illustrated in the embodiments of the present invention in FIGS. 1 and 2. With drum-type brakes 40', fluid conventionally is only operably supplied to the brakes and does not circulate through the brakes. The construction and operation of drum-type brakes are understood by those skilled in the art. It will be understood by those skilled in the art that drum and disk type braking systems 20, 20', 20" are included in the present invention and portions are properly applicable recognizing the constraints of these different types of braking systems.

The drum-type braking system 20" only has one series of brake lines 90' for providing inlet and outlet brake flow thereto and therefrom. The brake lines 93a', 93b' are connected to the calipers 46' of these brakes 40', and more particularly to the piston chambers 43' thereof. Actuation of pistons 44' positioned within the piston chambers 43' actuates the application of the braking heads 41' having pads 42 secured thereto. Because the construction and operation of drum-type brakes are understood by those skilled in the art, as discussed above, for brevity purposes the construction and operation characteristics for the rear brake delay valves 60, 60' as described above and below are also applicable to drum-type braking system 20" and will not be described further herein.

FIG. 8 illustrates a second embodiment of a rear brake delay valve 60' according to the present invention having a housing 61' which includes first and second openings 62', 63' therein. The housing 61' has a plurality of inner channels and chambers 64a', 64b', 64c', 64d' extending therethrough for allowing fluid to flow in both directions during application and during release of the brakes 40'. The delay valve 60' in this embodiment has an adjustable rod member 68', i.e., needle valve 65b', attached to the housing 61' and cooperating with a portion of an inner channel 64c' of the housing 61' for providing a predetermined rate of fluid flow through the channel 64c' to the rear brakes 40'. The adjustable rod member 68' has a rotating knob 69' connected to a main body portion thereof. The needle valve 65b' as such thereby controls the size of the portion of the channel 64c' cooperating with the rod member 68', i.e., adjustable orifice or channel.

The delay valve 60' also includes a ball-and-spring type check valve 65a' operatively positioned in another portion of the inner channel 64a', and more particularly in inner chamber 64b', to allow fluid to flow only through the portion of the channel 64c' having the rod member 68' extending therein during application of the brakes 40' and through both portions of the channel 64c', 64d' during release of the brakes 40'. The check valve 65a' preferably includes a ball 66' positioned closely adjacent a chamfered portion of the inner channel 64d' as illustrated and a spring 67' positioned closely adjacent the ball 66' and a main body portion of the check valve 65a'. This increased fluid flow during the release reduces or prevents the brakes from dragging and overheating such as caused by conventional restriction valves.

As illustrated is FIGS. 1–7 and as described herein, the present invention also includes a method of delaying fluid flow from a piston chamber 74 of a master cylinder 70 to a pair of rear brakes 40. The method preferably includes positioning at least a perforated member 67 having a plurality of openings therein in fluid communication with the piston chamber 74 of the master cylinder 70 for operative fluid communication with the pair of rear brakes 40. During application of the brakes 40 of the vehicle, fluid passes from the piston chamber 74 through at least one opening 69a or orifice in the perforated member and to the pair of rear brakes 40 so as to delay fluid flow thereto. During release of the rear brakes 40, however, fluid passes from the pair of rear brakes 40 through a plurality of the openings 69c in the perforated member 67 and to the piston chamber 74 of the master cylinder 70 so as to allow fluid to readily flow from the pair of rear brakes 40 and to the piston chamber 74.

In the drawings and specification, there have been disclosed illustrated embodiments of the invention and, although specific terms are employed, they are used in a descriptive sense only and not for the purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed is:

1. A vehicle braking system for delaying the flow of brake fluid to the rear brakes, the braking system comprising:

a master cylinder;

a pair of hydraulically operable disk brakes respectively positioned on a pair of rear wheels of a vehicle;

an inlet brake line in fluid communication with said master cylinder and connected to said pair of rear disk brakes;

an outlet brake line in fluid communication with said pair of rear disk brakes and in fluid communication with said master cylinder;

a fluid circulator valve positioned between and in fluid communication with said master cylinder and said pair of rear disk brakes, and connected to said inlet brake lines, said fluid circulator valve allowing fluid to flow therethrough in only one direction from said master cylinder to said inlet brake line and to said pair of rear disk brakes, and said fluid circulator valve also allowing fluid to flow in only one direction from said pair of rear disk brakes, through said outlet brake line, through said fluid circulator valve, and into said master cylinder; and a rear brake delay valve positioned between and in fluid communication with said circulator valve and said master cylinder and connected to said inlet brake line for delaying at least an initial braking pressure received by said pair of rear disk brakes as related to front brakes responsive to an initial actuation of said master cylinder, said rear brake delay valve including a housing having a first opening connected to a first portion of said inlet brake line fluidly connected to said master cylinder and a second opening connected to a second portion of said inlet brake line fluidly connected to said fluid circulator valve, and a perforated member having a predetermined sized orifice extending therethrough positioned within said housing in fluid communication with said first and second openings whereby said rear brake delay valve delays fluid flowing from said first opening through said second portion of said inlet brake lines, and to said pair of rear disk brakes.

2. A vehicle braking system as defined in claim 1, wherein said rear brake delay valve further includes resilient means secured to at least said perforated member for resiliently moving in directions corresponding to fluid flow directions, and a predetermined sized orifice extending through said resilient means, said resilient means being adapted to cooperate with at least said perforated member so that fluid flowing from said first opening is directed to flow only through said orifice of at least said perforated member and said orifice of said resilient means and to said second opening, through said second portion of said inlet brake lines and, to said pair of rear disk brakes, and said resilient means also allowing fluid flowing from said second opening through at least said perforated member to said first opening, and to said first portion of said inlet brake lines.

3. A vehicle braking system as defined in claim 2, wherein said housing of said rear brake delay valve further comprises an expansion chamber positioned within said housing and fluidly communicating with said first and second openings for receiving fluid therein, and wherein said perforated member is positioned in said expansion chamber.

4. A vehicle braking system as defined in claim 2, wherein said perforated member of said rear brake delay valve comprises a first perforated member having a plurality of openings therein and said rear brake delay valve further includes a second perforated member having a plurality of openings therein including a predetermined sized orifice, and said resilient means is positioned between said first and second perforated members so as to cover said plurality of openings in said first and second perforated members except for each of said respective orifices therein so that fluid flowing from said first opening is directed to flow only through said respective orifices of said first perforated member, said resilient means, and said second perforated member and to said second opening, through said second portion of said inlet brake lines and, to said pair of rear disk brakes, and said resilient means also allowing fluid flowing from said second opening through said plurality of openings of said first and second perforated members to said first opening, and to said first portion of said inlet brake lines.

5. A vehicle braking system as defined by claim 4, wherein said resilient means of said rear brake delay valve comprises an elastomeric member having a medial portion thereof secured between respective medial portions of said first and second perforated members.

6. A vehicle braking system as defined by claim 5, wherein said elastomeric member of said rear brake delay valve comprises a rubber disk.

7. A vehicle braking system as defined by claim 4, wherein said first perforated member of said rear brake delay valve has a generally concave shape and said second perforated member has a generally dome shape, and wherein said first concave-shaped perforated member is cooperatively positioned within the inner confines of said dome-shaped second perforated member.

8. A vehicle braking system as defined by claim 7, wherein said second perforated member of said rear brake delay valve further comprises a flange extending outwardly from the base of said dome-shaped second perforated member for facilitating the positioning thereof within said expansion chamber of said housing.

9. A vehicle braking system as defined in claim 1, wherein said fluid circulator valve comprises a housing having a first opening connected to said inlet brake line, a second opening connected to said outlet brake line, and a third opening connected to said master cylinder of the braking system, an expansion chamber positioned within said housing and communicating with all of said openings for receiving fluid therein, and first and second valve means positioned within said housing in communication with said expansion chamber and being in fluid communication with each other within said housing, said first valve means constructed for allowing fluid to flow therethrough in only one direction and through said first opening, and said second valve means constructed for allowing fluid to flow therethrough and through said second opening and in a common direction as the fluid flow through said first valve means.

10. A vehicle braking system for delaying the flow of brake fluid to the rear brakes, the braking system comprising:

a master cylinder;

a pair of hydraulically operable disk brakes respectively positioned on a pair of rear wheels of a vehicle;

a rear inlet brake line in fluid communication with said master cylinder and connected to said pair of rear disk brakes;

a rear outlet brake line in fluid communication with said pair of rear disk brakes and in fluid communication with said master cylinder; and a rear brake delay valve positioned between and in fluid communication with said master cylinder and said pair of rear disk brakes and connected to said rear inlet brake line for delaying at least an initial braking pressure received by said pair of rear disk brakes as related to front brakes responsive to an initial actuation of said master cylinder, said rear brake delay valve including a housing having a first opening connected to a first portion of said rear inlet brake line connected to said master cylinder and a second opening connected to a second portion of said rear inlet brake line connected to said pair of rear brakes, a perforated member having a plurality of openings therein, an elastomeric member cooperating with said perforated member, and a separate predetermined sized orifice extending through said perforated member and said elastomeric member, said perforated member and said elastomeric member each being positioned within said housing in fluid communication with said first and second openings, said elastomeric member being adapted to cooperate with said perforated member so that fluid flowing from said first opening is directed to flow only through said orifice and to said second opening, through said second portion of said rear inlet brake line, and to said pair of rear disk brakes, and said elastomeric member also allowing fluid flowing from said second opening through said plurality of openings of said perforated member to said first opening, and to said first portion of said rear inlet brake line.

11. A vehicle braking system as defined in claim 10, wherein said housing of said rear brake delay valve further includes an expansion chamber positioned within said housing and fluidly communicating with said first and second openings for receiving fluid therein, and wherein said perforated member and said elastomeric member are each positioned in said expansion chamber.

12. A vehicle braking system as defined in claim 11, wherein at least said perforated member of said rear brake delay valve comprises a first perforated member having a plurality of openings therein and said rear brake delay valve further includes a second perforated member having a plurality of openings therein including a predetermined sized orifice, and said elastomeric member is positioned between said first and second perforated members so as to cover said plurality of openings in said first and second perforated members except for each of said respective orifices therein so that fluid flowing from said first opening is directed to flow only through said respective orifices of said first perforated member, said resilient means, and said second perforated member and to said second opening, through said second portion of said inlet brake lines and, to said pair of rear disk brakes, and said resilient means also allowing fluid flowing from said second opening through said plurality of openings of said first and second perforated members to said first opening, and to said first portion of said inlet brake lines.

13. A vehicle braking system as defined by claim 12, wherein said elastomeric member of said rear brake delay valve has a medial portion thereof secured between respective medial portions of said first and second perforated members.

14. A vehicle braking system as defined by claim 13, wherein said first perforated member of said rear brake delay valve has a generally concave shape and said second perforated member has a generally dome shape, and wherein said first concave-shaped perforated member is cooperatively positioned within the inner confines of said dome-shaped second perforated member.

15. A vehicle braking system as defined by claim 14, wherein said second perforated member of said rear brake delay valve further comprises a flange extending outwardly from the base of said dome-shaped second perforated member for facilitating the positioning thereof within said expansion chamber of said housing.

16. A vehicle braking system as defined by claim 15, wherein said elastomeric member of said rear brake delay valve comprises a rubber disk.

17. A vehicle braking system for delaying the flow of brake fluid to the rear brakes, the braking system comprising:

a master cylinder comprising a housing having first and second openings respectively connected to front and rear brake lines, a fluid reservoir connected to said housing, a piston chamber positioned within said housing and in fluid communication with said first and second openings and said fluid reservoir, a piston positioned within said piston chamber, and a rear brake delay valve positioned within said housing of said master cylinder and in fluid communication with said second opening and said piston chamber for delaying at least an initial braking pressure received by said pair of rear disk brakes as related to front brakes responsive to an initial actuation of said master cylinder;

a pair of hydraulically operable brakes respectively positioned on a pair of front wheels of a vehicle;

a front brake line connected to and in fluid communication with said first opening of said master cylinder and said pair of front brakes; a pair of hydraulically operable brakes respectively positioned on a pair of rear wheels of a vehicle;

a rear brake line connected to and in fluid communication with said second opening of said master cylinder and said pair of rear brakes; and said rear brake delay valve of said master cylinder including a perforated member having a plurality of openings therein, an elastomeric member secured to said perforated member, a separate predetermined sized orifice extending through a medial portion of said perforated member and said elastomeric member, said elastomeric member cooperating with said plurality of openings of said perforated member so that fluid flowing from said piston chamber is directed to flow only through said predetermined sized orifice, through said second opening and said inlet brake line, and to said pair of rear brakes, and said elastomeric member allowing fluid flowing from said second opening to also flow through said plurality of openings of said perforated member to said piston chamber.

18. A vehicle braking system as defined in claim 17, wherein at least said perforated member of said rear brake delay valve comprises a first perforated member having a plurality of openings therein and said rear brake delay valve further includes a second perforated member having a plurality of openings therein including a predetermined sized orifice, and said elastomeric member is positioned between said first and second perforated members so as to cover said plurality of openings in said first and second perforated members except for each of said respective orifices therein so that fluid flowing from said piston chamber is directed to flow only through said respective orifices of said first perforated member, said elastomeric member, and said second perforated member, through said second opening, through said rear brake lines, and to said pair of rear disk brakes, and said elastomeric member also allowing fluid flowing from said pair of rear brakes, through said rear brake lines, through said second opening, and through said plurality of openings of said first and second perforated members to said piston chamber.

19. A vehicle braking system as defined by claim 18, wherein said elastomeric member of said rear brake delay valve has a medial portion thereof secured between respective medial portions of said first and second perforated members.

20. A vehicle braking system as defined by claim 19, wherein said first perforated member of said rear brake delay valve has a generally concave shape and said second perforated member has a generally dome shape, and wherein said first concave-shaped perforated member is cooperatively positioned within the inner confines of said dome-shaped second perforated member.

21. A vehicle braking system as defined by claim 20, wherein said second perforated member of said rear brake delay valve further comprises a flange extending outwardly from the base of said dome-shaped second perforated member for facilitating the positioning of the rear brake delay valve within said housing of said master cylinder.

22. A vehicle braking system as defined by claim 21, wherein said elastomeric member of said rear brake delay valve comprises a rubber disk.

23. A rear brake delay valve for a vehicle braking system, the rear brake delay valve comprising:
a housing having a first opening arranged to be connected to a first portion of a brake line fluidly connected to a master cylinder and a second opening arranged to be connected to a second portion of the brake line fluidly connected to a pair of rear brakes; and
a valve means positioned within said housing in fluid communication with said first and second openings for delaying at least an initial braking pressure received by said pair of rear disk brakes as related to front brakes responsive to an initial actuation of said master cylinder, said valve means including a perforated member having a first predetermined sized orifice extending therethrough and resilient means secured to said perforated member for resiliently moving in directions corresponding to fluid flow directions, and a second predetermined sized orifice extending through said resilient means, said resilient means being adapted to cooperate with said perforated member so that fluid flowing from said first opening is directed to flow only through said first orifice of said perforated member and said second orifice of said resilient means and to said second opening, through said second portion of the brake lines, and to the pair of rear disk brakes, and said resilient means also allowing fluid flowing from said second opening through said perforated member to said first opening, and to said first portion of said inlet brake lines.

24. A rear brake delay valve as defined in claim 23, wherein said housing of said rear brake delay valve further comprises an expansion chamber positioned within said housing and fluidly communicating with said first and second openings for receiving fluid therein, and wherein said valve means comprises a check valve positioned in said expansion chamber.

25. A rear brake delay valve as defined in claim 24, wherein said perforated member of said check valve comprises a first perforated member having a plurality of openings therein and said check valve further comprises a second perforated member having a plurality of openings therein including a predetermined sized orifice, and said resilient means is positioned between said first and second perforated members so as to cover said plurality of openings in said first and second perforated members except for each of said respective orifices therein so that fluid flowing from said first opening is directed to flow only through said respective orifices of said first perforated member, said resilient means, and said second perforated member and to said second opening, through said second portion of said inlet brake lines and, to said pair of rear disk brakes, and said resilient means also allowing fluid flowing from said second opening through said plurality of openings of said first and second perforated members to said first opening, and to said first portion of said inlet brake lines.

26. A rear brake delay valve as defined by claim 25, wherein said resilient means comprises an elastomeric member having a medial portion thereof secured between respective medial portions of said first and second perforated members.

27. A rear brake delay valve as defined by claim 26, wherein said first perforated member has a generally concave shape and said second perforated member has a generally dome shape, and wherein said first concave-shaped perforated member is cooperatively positioned within the inner confines of said dome-shaped second perforated member.

28. A rear brake delay valve as defined by claim 27, wherein said second perforated member further comprises a flange extending outwardly from the base of said dome-shaped second perforated member for facilitating the positioning thereof within said expansion chamber of said housing.

29. A rear brake delay valve as defined by claim 28, wherein said elastomeric member comprises a rubber disk.

* * * * *